Figure 1:
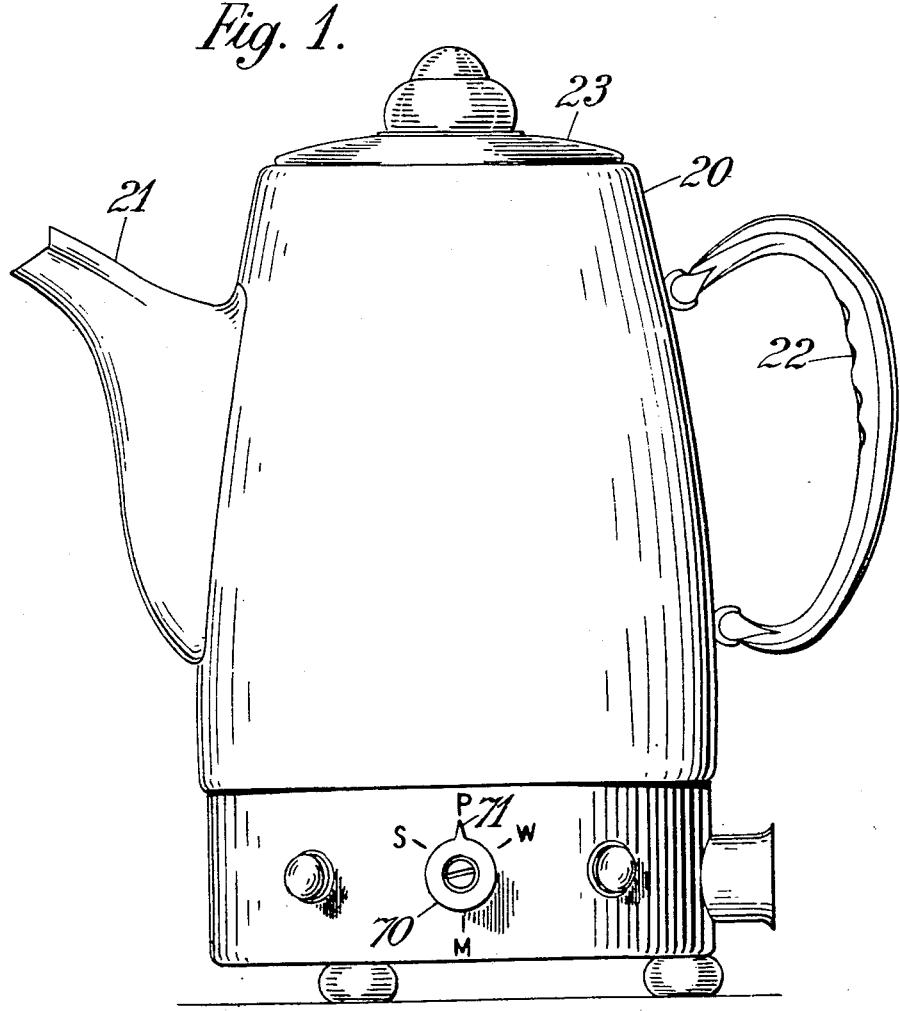

Dec. 4, 1956 F. L. BEST 2,773,166
COFFEE PERCOLATOR
Filed April 30, 1954 5 Sheets-Sheet 2

INVENTOR
Fredric L. Best
By Watson, Cole, Grindle &
Watson ATTORNEYS

Dec. 4, 1956 F. L. BEST 2,773,166
COFFEE PERCOLATOR
Filed April 30, 1954 5 Sheets-Sheet 3
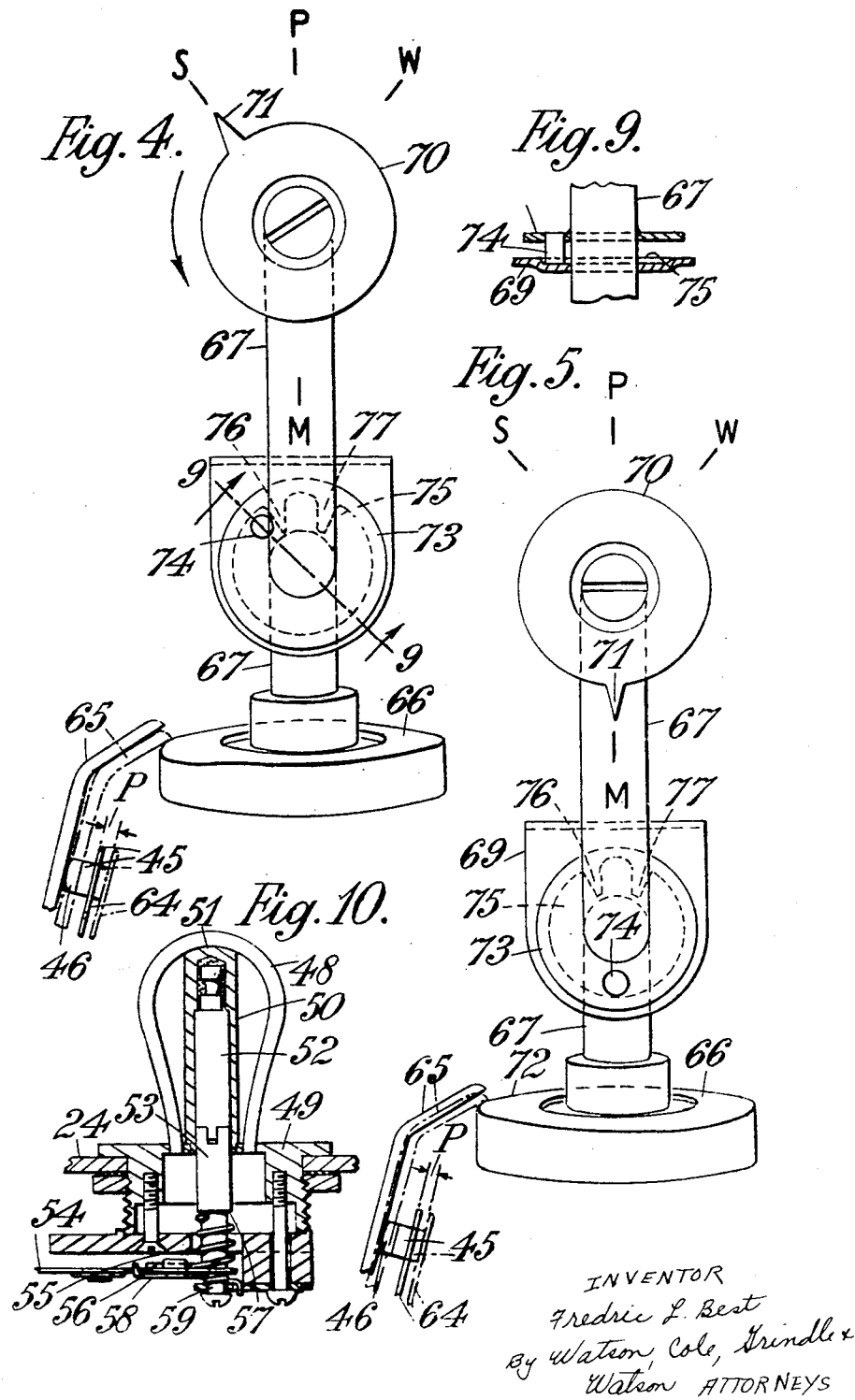
INVENTOR
Fredric L. Best
By Watson, Cole, Grindle &
Watson ATTORNEYS

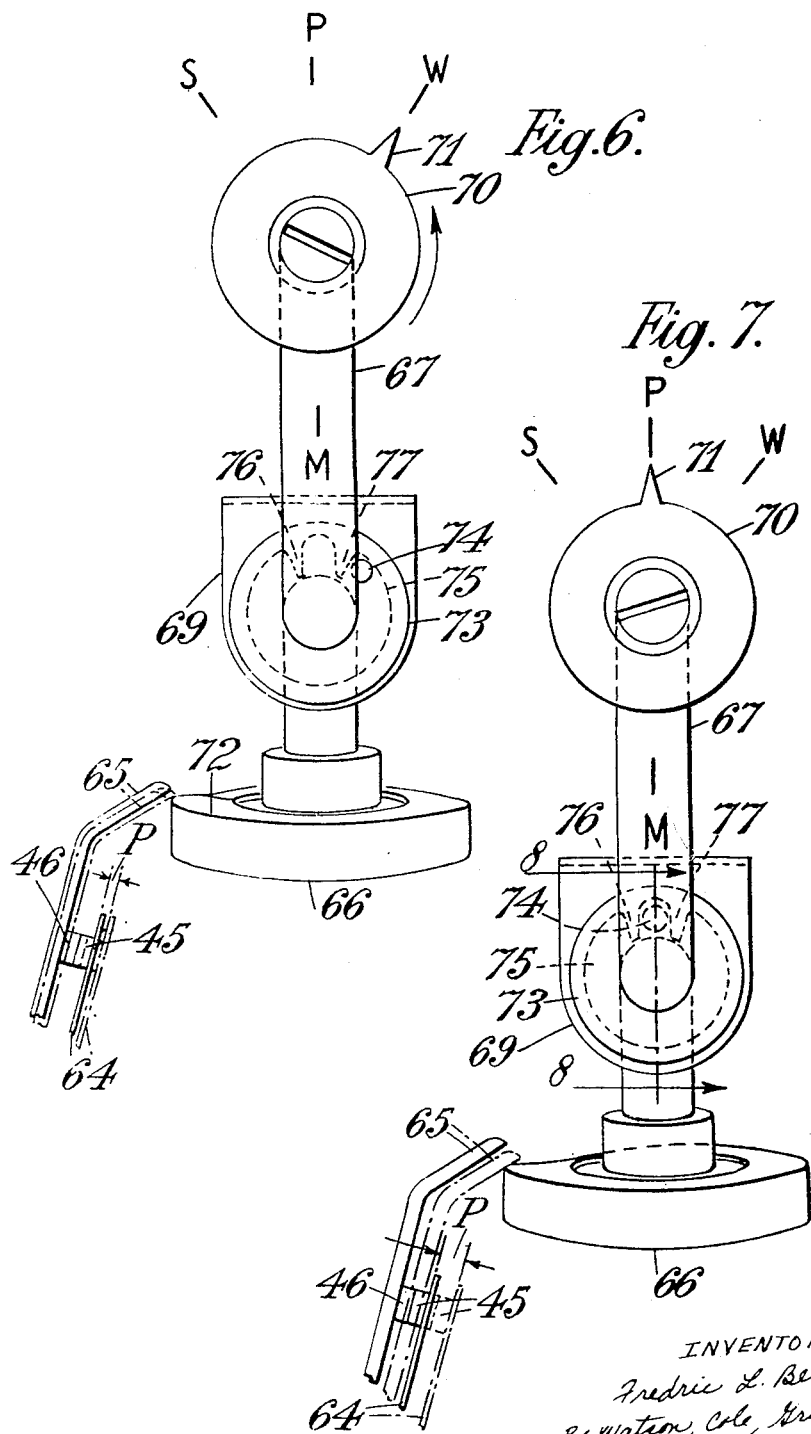

Dec. 4, 1956  F. L. BEST  2,773,166
COFFEE PERCOLATOR
Filed April 30, 1954  5 Sheets-Sheet 5
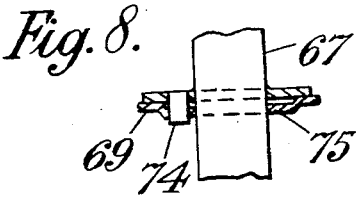
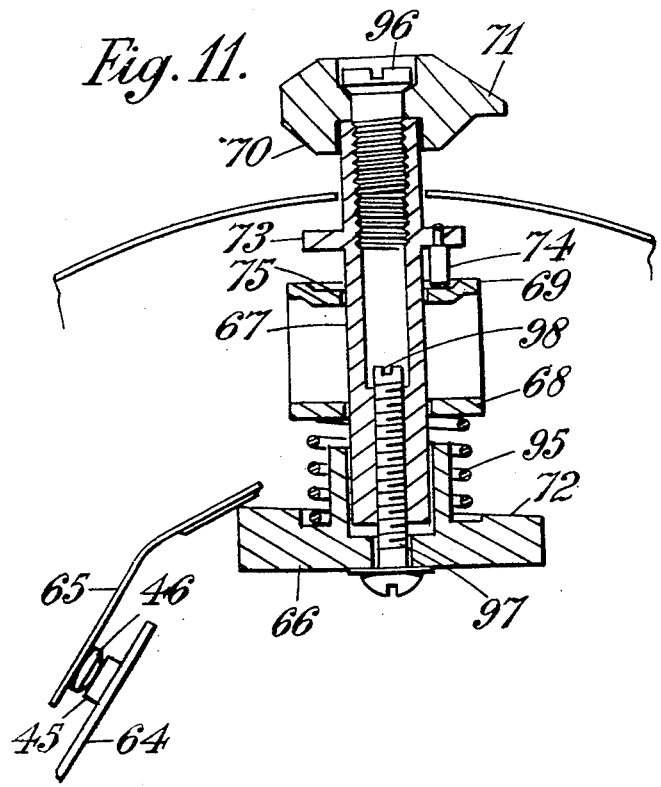
INVENTOR
Fredric L. Best
By Watson, Cole, Grindle &
Watson ATTORNEYS United States Patent Office 2,773,166
Patented Dec. 4, 1956

2,773,166

COFFEE PERCOLATOR

Fredric Lafargue Best, Felixstowe, England, assignor of one-half to Best Products Limited, Felixstowe, England, a British company Application April 30, 1954, Serial No. 426,798

Claims priority, application Great Britain April 23, 1954

3 Claims. (Cl. 219—44)

This invention relates to electrically-heated coffee percolators and has for an object to provide a novel construction wherein the operation of preparing the infusion of coffee is largely automatic, and wherein there is further provided a safety device which overrides any other control to ensure that the electrical heating element is protected from damage by overheating in such events as the percolator being switched on without any water in it, or the water boiling away, or the coffee being used up whilst the percolator is still connected to the electric supply means.

A further object of the invention is to provide in a percolator, an automatic control for the flavour of the coffee, such control being capable of being preset to produce strong, medium or weak coffee by an adjustment which is preferably continuously variable between the two extreme limits.

More specifically, another object of the invention is to provide means whereby when the period of percolation has been preset, on completion of that said period, the process of percolation is automatically stopped, but the coffee is maintained at a suitably high temperature for use.

A further object of the invention is to provide means for over-riding the said control of the period of percolation so that continuous percolation can be obtained if so desired.

Further features of the invention will be described in relation to a specific embodiment of the invention which is hereinafter described and illustrated in the accompanying drawings.

Figure 2:
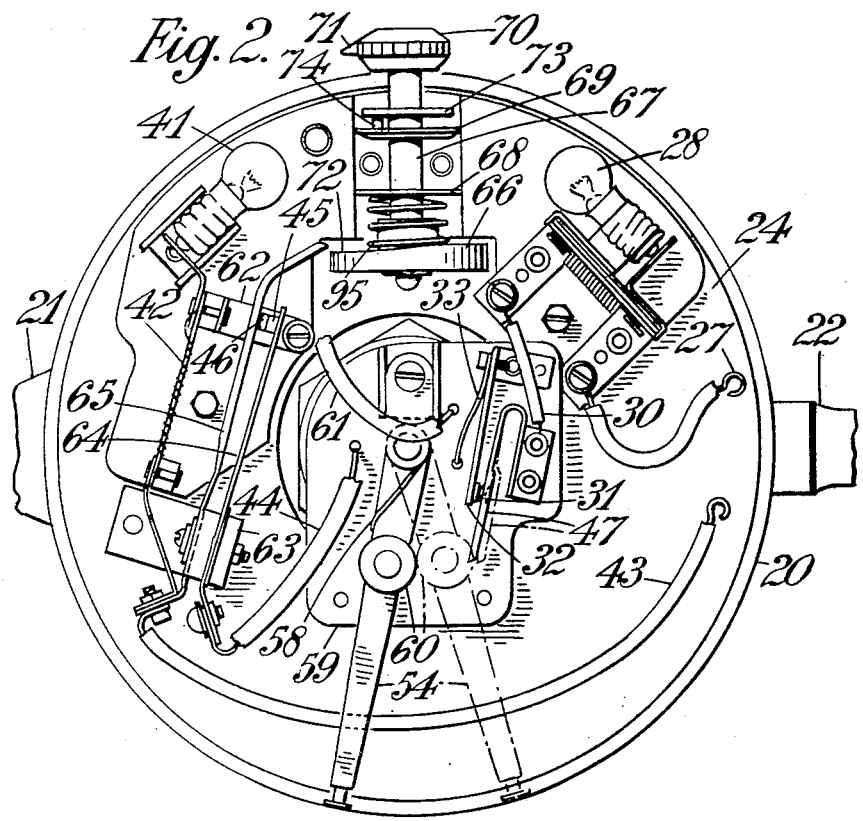
Figure 3:
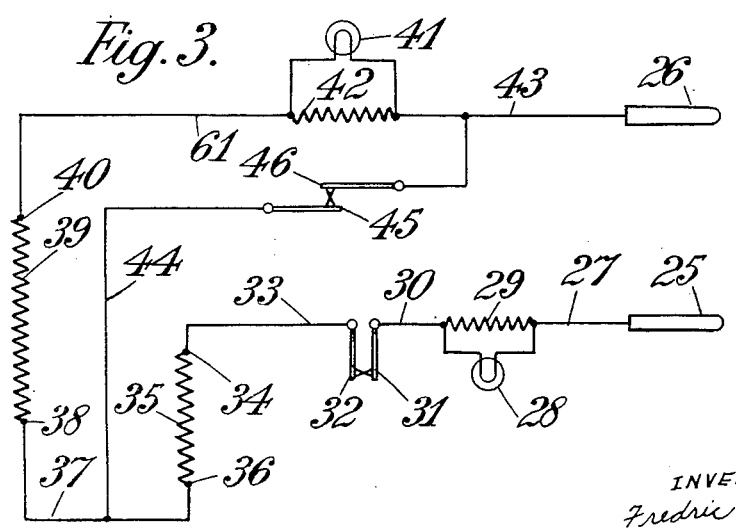

In the drawings,

Figure 1 is a side elevation showing the complete percolator,

Figure 2 is a view of the underside of the body of the percolator with the cover of the base removed to show the construction and arrangement of the controlling switches, Figure 3 is a circuit diagram, Figures 4, 5 and 6 are detail views, distorted for ease in understanding, of the flavour-control device, Figure 7 is another view similar to Figures 4 to 6 showing another setting of the control device, Figures 8 and 9 illustrate a detail of the control device, Figure 10 is a sectional elevation showing the construction and arrangement of the safety device and its control, and Figure 11 is a sectional view of a detail.

Referring to Figures 1 and 2, the percolator comprises a liquid-containing vessel 20 having a spout 21, handle 22 and lid 23. An electrical heating element is mounted on the bottom of the container 20 with the usual arrangement of tube extending upwardly from it to a container for the coffee so that the water heated by the heating element rises and percolates through the coffee. The controlling switches and connections for the heater are mounted on the underside of the bottom 24 of the container as shown in Figure 2.

The electrical circuit will first be described with reference to Figure 3. Two contact pins 25 and 26 are provided in a suitable plug to receive the coupling member, whereby the percolator is connected to the main electric supply. From the pin 25 a circuit is made by the wire 27 to an indicating lamp 28 having a suitable shunt resistance 29 and thence by the wire 30 to the contact 31 of a normally closed safety switch. The other contact is shown at 32, and from it connection is made by a wire 33 to one end 34 of a resistance unit 35 which constitutes the main heating element, the value of this resistance being such that it will give the required heating, say, for example 500 watts, during the operation of the percolator. The other end 36 of the unit 35 is connected by 37 to one end 38 of a second resistance element 39 of which the other end 40 is connected through an indicating lamp 41 and shunt resistance 42 by a wire 43 to the second mains contact 26. The value of the resistance 39 is made such that when it is connected in series with the unit 35 across the mains, only a comparatively small current passes so that the total heat dissipated by the two resistance units is sufficient merely to prevent cooling of the contents of the percolator. This is achieved by a heat dissipation of the order of, for example, 50 watts.

From a point between the resistance units 35 and 39, connection is made by a wire 44 to one contact 45 of a switch whereof the other contact 46 is connected by the wire 43 to the mains contact 26; this switch is normally closed, being a thermally-operated switch, and when closed, it short circuits the resistance unit 39 and indicating lamp 41.

The reference numerals in the circuit diagram, Figure 3 are also used in Figure 2 to indicate the corresponding parts, and the switches 31, 32 and 45, 46 which are shown diagrammatically in the circuit diagram are constructed as shown in Figure 2. The switch contact 31 is mounted on a spring arm 47, and is normally held in contact by the formation of the spring with the contact 32 which is rigidly mounted. This switch is the safety device which protects the heating element from damage through overheating, and the mechanism by which this is effected will now be described with reference to Figure 10. The heating element comprising the two resistance units 35, 39 is of horse-shoe form as shown at 48 mounted in a suitable head 49 by which it is secured to the bottom 24 of the container 20. The element 48 extends upwards in the container, and there is provided in it a tube 50 having a closed end 51 which is secured in good thermal contact with that part of the element 48 which is most remote from the head 49 and is the part most liable to become overheated, for example by a lowering of the liquid level in the container and also by its being the part most remote from the head 49 which conducts away a certain amount of heat from the element. The tube 50 contains a spindle 52 which is suitably shouldered at its upper end to provide a cavity which is filled with a fusible alloy selected to have a melting point below the temperature at which the element 48 will suffer damage. The spindle 52 is coupled by a suitable tongue joint to a shaft 53 which extends downwards and has secured on its lower end, a lever arm 54, this arm being also shown in Figure 2. The arm is mounted to rotate freely with respect to the shaft 53, but is coupled thereto by a helical spring 55 which fits closely around the shaft as to its helical portion, and has a radially projecting portion 56 secured on the arm 54. This spring 55 constitutes a one-way clutch between the arm and the shaft 53 whereby angular movement of the arm 54 in one direction takes place freely with respect to the shaft 53, but in the other direction, it grips the shaft 53 so that the arm cannot move unless the shaft is free to rotate.

The arm 54 is provided with another spring 58 (see Figure 10 and Figure 2) which tends to rotate the arm 54 anti-clockwise in Figure 2. The arm 54 also carries a disc 60 of insulating material which is so positioned that when it swings anti-clockwise in Figure 2, the disc engages the spring arm 47 carrying the contact 31 and moves it away from the contact 32 thereby opening this switch. In all normal operation, the arm occupies the position shown in full lines in Figure 2 and the fusible alloy remains solid, thereby holding the spindle 52, shaft 53 and arm 54 against movement. If, however, the heating element 48 becomes overheated, the fusible alloy softens or melts and thereby allows the spindle 52 and shaft 53 to rotate so that the spring 58 can rotate the arm 54 to the position shown in broken lines in Figure 2, opening the switch. After the element 48 has cooled down and the fusible alloy has set again, the spindle 52 becomes locked again and thereby locks the shaft 53, and the arm 54 is then reset by moving it clockwise; this movement is possible because the spring 55 automatically disengages itself from the shaft 53 in this movement, but the arm 54 is retained in this set position, against the action of the spring 58, because the spring 55 re-engages with the shaft 53 on anti-clockwise movement. The spring 58 has a few, say two, coils surrounding the shank of the screw 59 in the end of the shaft 53, with a short arm extending to the right in Figure 10 to a fixed anchorage, and a longer arm extending to the left engaged with the arm 54 to rotate it. The coiled portion of this spring is in axial compression, pressing the shaft 53 and the spindle 52 upwards in the tube 50 so that the shouldering of the spindle seals the cavity containing the fusible alloy.

The two resistance units 35 and 39 are both embodied in the heater element 48, together with their connection 37. As shown in Figure 2 the switch contact 32 is connected by the wire 33 to the heater element (which does not appear in Figure 2) and the other end of the resistance elements 40 is connected by the wire 61 to the signal lamp 41 and shunt 42 which are mounted on the bracket 62.

The connection between the points 36, 38 of the heater element by the wire 44 as shown in Figure 2, goes to the contact 45 of the second switch whereof the other contact 46 is also connected to the wire 43 and thence to the mains connector.

The switch 45, 46 is a thermally-operated switch, which is mounted on a block or bracket 63, which is secured on the bottom 24 of the container 20 so that it is subject to the temperature of the liquid in the container. The contact 45 of the switch is carried on a bi-metallic strip 64 which, when heated by conduction through the bracket 63, tends to move away from the co-operating contact 46. This contact 46, however, is carried on a spring strip 65 which is biassed so that it causes the contact 46 to follow up movement of the contact 45 until the strip 65 is restrained from further movement.

This restraint or control of the spring strip 65 is effected by means of a cam 66, shown in Figures 2 and 11, and also diagrammatically in Figures 4, 5, 6 and 7, which are distorted for ease of understanding. The cam 66 is mounted on a shaft 67 rotatable in brackets 68, 69. The outer end of the shaft 67 projects through the casing surrounding the base of the container 20 and carries a knob or handle 70 having a pointer 71, see also Figure 1. The cam 66 is a disc whereof the upper face is shaped so that the upper edge 72, by rotation of the shaft 67, can be adjusted towards and away from the end of the spring strip 65. When this end of the spring strip is moving, following up the contact 45, it moves freely until it engages the edge 72 of the cam which prevents any further movement in that direction.

The mechanical construction of the cam 66 and its mounting is shown in detail in Figure 11. The knob 70 is mounted for example by a D-shaped hole in it, so as to be non-rotatable with respect to the shaft 67, and is retained thereon by a screw 96 screwed into the end of the shaft which is hollow. The cam 66 is similarly mounted so as not to be rotatable on the shaft and is retained and located axially on it by a screw 97. A compression spring 95 between the bracket 68 and the cam 66 presses the cam 66 downwards in Figure 11 to the position determined by the head of the screw 97, and this screw is accessible for adjustment or readjustment after assembly by removing the screw 96 and inserting a screwdriver through the shaft to engage a notch 98 on the inner end of the screw 97.

The axial location of the shaft 67, and the parts carried by it is determined as follows: The shaft 67 carries a plate 73 having a pin 74 extending parallel with the axis and engaging, as shown in Figure 11, in a recess 75 in the bracket 69. The compression spring 95 holds the assemblage on the shaft 67 with the pin 74 in engagement with a recess 75 in the bracket 69.

As shown in Figure 4, the recess 75 extends around the shaft and is terminated by two shoulders 76, 77 which limit the movement of the pin 74, and, therefore, the rotation of the shaft and the cam 66. Adjacent the pointer 71 there is provided on the casing, a series of markings which in an anticlockwise direction are respectively S, M and W signifying strong, medium and weak, and the control knob 70 is adjustable with respect to the two stops 76, 77 from S through the position M to W. This rotation of the shaft determines, by means of the cam 66, the amount of movement of the spring arm 65 before the switch contacts 45, 46 are separated. Figure 6 shows this distance P at the minimum setting for weak, Figure 5 shows the distance P somewhat greater for medium setting, and Figure 4 shows the distance P at its maximum setting for the position S.

This arrangement provides for the automatic flavour control of the coffee, as mentioned above, since the bi-metal strip 64 which carries the contact 45 is heated by conduction through the block 63 from the base of the container, which, in turn, is subjected to the temperature of the liquid therein. When heating of the water is first started, there is localised heating closely around the heating element which sets up the necessary percolation, and the percolation continues until the temperature of the bi-metal strip 64 attains a value sufficient to separate its contact from the contact on the spring strip 65. A period of time elapses during the rise of temperature of the water due to percolation, and the length of this period is determined by the time which the bi-metal strip requires to reach the selected temperature. The further the spring strip 65 is allowed to move before it is restrained, the longer is the time during which percolation continues, thus giving weak, medium or strong coffee according to the setting of the knob 70.

Owing to the thermal lag of the bi-metal switch, it is set to open the contacts 45, 46 at a lower temperature than the water at the top of the percolator. In practice, it is set, when the cam 66 is in the "strong" position to open at about 60° C. when the water temperature has reached about 95° C.

The heat supplied thereafter to keep the coffee hot, i. e. at about 75° C. is sufficient to prevent the contacts from closing again. The common practice of switching the current on and off is thereby avoided, and interference with radio and television reception is eliminated. When the setting of the cam 66 is for "weak or medium," similar relations of the temperatures of the water and the bi-metal strip are obtained.

Another feature of this invention, consists in providing between the two stops 76, 77 in the recess 75, a position in which, as shown in Figure 8, the pin 74 passes through a hole in the plate 69, thereby permitting an axial movement of the shaft 67 and cam 66 greater than is determined by the depth of the recess 75. This movement carries the cam 66 to a position in which the contacts 45, 46 will not be separated even when the bi-metal strip 64 reaches the maximum temperature which it can attain by conduction from the liquid, so that the circuit is never interrupted and percolation is continuous. This is indicated by the pointer 71 at the position P.

It should be noted that this position P cannot be reached by accidental rotation of the knob 70 beyond the "weak" or "strong" positions respectively, but requires a deliberate adjustment by withdrawing the shaft 67 to lift the pin 74 over one or other of the stops 76, 77 and then allowing it to drop back under the action of the spring 75 into the "continuously percolating" setting.

In the operation of this device, the coffee and the water are placed in the container in the usual manner. The safety switch 31, 32 will normally be closed, with the arm 54 in the position shown in full lines in Figure 2, and the switch 45, 46 will also be closed as the water is cold and the bi-metal strip 64 has not been heated. The current, therefore, passes through the resistance unit 35 and thence by the switch 45, 46 so that the maximum rate of heating is obtained. Percolation is set up and continues over a period of time which is predetermined, as described above, by the setting of the control knob 70 to strong, medium or weak, as the case may be. As soon as the period of percolation thus predetermined has elapsed, the switch 45, 46 is opened, thereby introducing the resistance element 39 into the heating circuit and effecting a substantial reduction of the energy supply, to an amount sufficient to keep the coffee hot. The adjustment of the flavour control switch 45, 46 is such that, when it has been opened, the reduced wattage used to keep the coffee hot is sufficient to keep these contacts apart.

As stated above, with any normal operation, the switch 31, 32 which constitutes the safety switch protecting the heating element 48 against damage, will normally be closed. If, however, it happens to have been left open from a previous operation, it is closed by simply moving the arm 54 from the position shown in chain lines in Figure 2, to its normal position shown in full lines. This switch operates as a complete safeguard against the overheating of the element 48, irrespective of the circumstances which produce such overheating, and it is reset after operation simply by movement of the arm 54.

The operation of the indicator lamps 28 and 41, coloured respectively red and green, is as follows: the red lamp 28, being in series with the heating element, lights up when percolation is taking place, i. e. when the maximum current is being taken, and in these circumstances, the green lamp 41 is short-circuited by the switch 45, 46 so that it is not lit up. When the switch 45, 46 has operated to reduce the current consumption to the minimum, or "keep hot" value, this current is not sufficient to cause the red lamp 28 to light up, but it is sufficient to cause the green lamp 41 to light up, this lamp having been brought into the current circuit by the operation of the switch 45, 46. The operation of the percolator is, therefore, apparent to the user, merely by observation of the lamps. On first switching on, the red lamp is lit, showing that the maximum rate of heating has started, and it remains lit till the selected flavour is attained; then the red lamp is extinguished and the green lamp lights up, showing that the coffee is being kept hot. If neither lamp lights up, or if the red lamp is extinguished immediately after switching on, the safety-switch 31, 32 is reset after having taken any necessary corrective action.

I claim:

1. In a coffee-percolator, the combination of a liquid-containing vessel, an electrical immersion heater element comprising a resistance in two sections, a heat-conductive tubular casing having a closed end in contact with said heater element, a shaft rotatable in said casing, a fusible alloy in said casing normally holding said shaft stationary, an arm rotatable on said shaft, a one-way clutch adapted to engage said arm with said shaft, a spring tending to rotate said arm and clutch and shaft, a first normally closed switch controlling the supply of current to said percolator operatively connected to said arm and operable automatically to interrupt the current by said spring moving said arm when said fusible alloy is melted, and operable in the opposite direction, by manual movement of said arm, a second normally closed switch controlling the current in one section of said resistance in said heater element, thermally actuated means adapted to open said switch on a rise of temperature, said actuating means being adjustable to select the temperature at which it operates to be lower than the melting point of said fusible alloy.

2. A construction according to claim 1, wherein the said one-way clutch is a helical spring anchored at one end to said shaft and at the other end to said arm, and coiled around said shaft in the direction to cause it to bind thereon and act as a clutch when said arm is moved by said spring.

3. A construction according to claim 1, wherein the casing for the shaft is formed near its closed end with an internal shoulder facing axially towards its open end, the shaft is formed with a co-operating shoulder abutting said internal shoulder, and the said spring is in axial compression to hold said shoulders in engagement with each other.

References Cited in the file of this patent

UNITED STATES PATENTS

| | | |
|---|---|---|
| 1,385,999 | Howard | Aug. 2, 1921 |
| 1,990,546 | Hubbard | Feb. 12, 1935 |
| 2,025,302 | Olds | Dec. 24, 1935 |
| 2,076,096 | Samuels et al. | Apr. 6, 1937 |
| 2,175,727 | Graham | Oct. 10, 1939 |
| 2,207,870 | Myers | July 16, 1940 |
| 2,538,573 | Kolisch | Jan. 16, 1951 |
| 2,610,284 | Kolisch | Sept. 9, 1952 |
| 2,657,300 | Sullivan | Oct. 27, 1953 |
| 2,726,300 | Davis | Dec. 6, 1955 |